United States Patent
Erickson et al.

(10) Patent No.: US 6,888,062 B1
(45) Date of Patent: May 3, 2005

(54) MOTOR ASSEMBLY HAVING IMPROVED ELECTROMAGNETIC NOISE FILTERING AND DISSIPATION

(75) Inventors: Staffan Erickson, Yellow Springs, OH (US); Kenneth M. Brun, Lebanon, OH (US); Terence C. Cartwright, Bellebrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 120 days.

(21) Appl. No.: 10/749,074

(22) Filed: Dec. 30, 2003

(51) Int. Cl.⁷ .................................................. H05K 9/00
(52) U.S. Cl. ..................................... 174/35 R; 333/12
(58) Field of Search ............................ 174/35 R, 35 C; 361/818, 816, 800; 333/12

(56) References Cited

U.S. PATENT DOCUMENTS

| | | | |
|---|---|---|---|
| 5,909,350 A | 6/1999 | Anthony | |
| 6,091,022 A | * 7/2000 | Bodin | ....................... 174/52.5 |
| 6,097,581 A | 8/2000 | Anthony | |
| 6,282,074 B1 | 8/2001 | Anthony | |
| 6,331,926 B1 | 12/2001 | Anthony | |
| 6,373,673 B1 | 4/2002 | Anthony | |
| 6,388,856 B1 | 5/2002 | Anthony | |
| 6,469,595 B2 | 10/2002 | Anthony et al. | |
| 6,498,710 B1 | 12/2002 | Anthony | |
| 6,509,807 B1 | 1/2003 | Anthony et al. | |
| 6,522,516 B2 | 2/2003 | Anthony | |
| 6,549,389 B2 | 4/2003 | Anthony et al. | |
| 6,563,688 B2 | 5/2003 | Anthony et al. | |
| 6,580,595 B2 | 6/2003 | Anthony et al. | |
| 6,594,128 B2 | 7/2003 | Anthony | |
| 6,603,646 B2 | 8/2003 | Anthony et al. | |
| 6,606,011 B2 | 8/2003 | Anthony et al. | |
| 2002/0024787 A1 | 2/2002 | Anthony | |
| 2002/0075096 A1 | 6/2002 | Anthony | |
| 2002/0079116 A1 | 6/2002 | Anthony | |
| 2002/0089812 A1 | 7/2002 | Anthony et al. | |
| 2002/0122286 A1 | 9/2002 | Anthony | |
| 2002/0131231 A1 | 9/2002 | Anthony | |
| 2003/0161086 A1 | 8/2003 | Anthony | |

* cited by examiner

Primary Examiner—Hung V. Ngo
(74) Attorney, Agent, or Firm—Michael D. Smith

(57) ABSTRACT

The subject invention provides a motor assembly having improved electromagnetic noise or interference (EMI) filtering and dissipation and includes a motor having at least two terminals. A carrier having an upper and a lower surface with an outer periphery defines apertures for receiving the terminals. First and second conductive regions are disposed on one of the upper and the lower surfaces and adjacent the apertures for electrically connecting to the terminals. A grounding region is disposed on one of the upper and the lower surfaces for grounding the carrier to an electrical ground and insulated from the first and the second conductive regions by a first non-conductive region. A circuit extends electrically connects the first and the second conductive regions to the grounding region for filtering EMI. A biasing device urges the grounding region of the carrier into electrical connection with the electrical ground for dissipating EMI and receptacles electrically connect the first and the second conductive regions to the terminals without requiring the terminals to be soldered to the carrier.

25 Claims, 7 Drawing Sheets

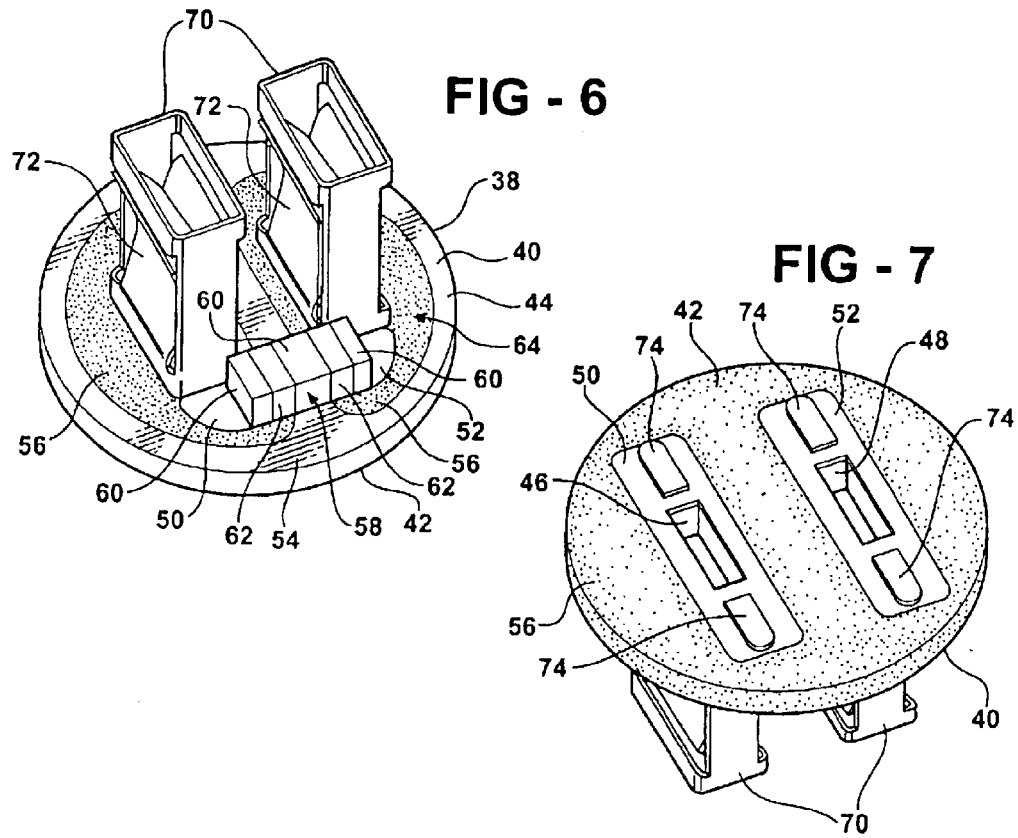
FIG - 6
FIG - 7
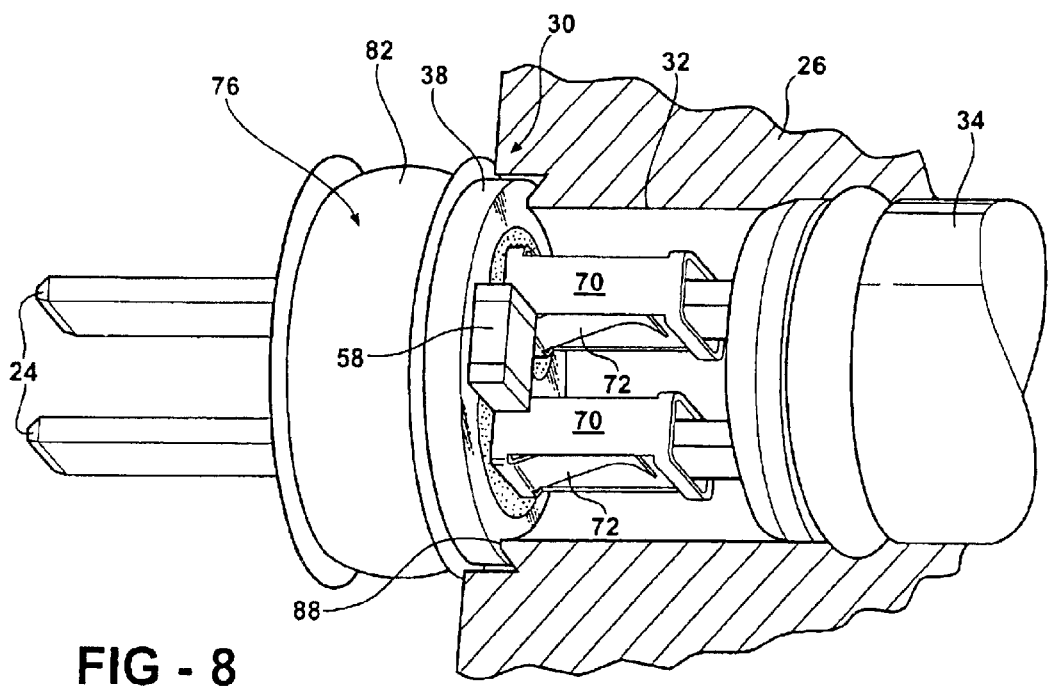
FIG - 8

MOTOR ASSEMBLY HAVING IMPROVED ELECTROMAGNETIC NOISE FILTERING AND DISSIPATION

BACKGROUND OF THE INVENTION

1) Field of the Invention

The subject invention relates to a motor assembly, and more specifically to a motor assembly having improved electromagnetic noise filtering and dissipation for use in a vehicle.

2) Description of Related Art

Electric motors are a tremendous source of electromagnetic emissions, noise, or interference (EMI). It is to be appreciated that EMI may refer to either radiated or conducted emissions, noise, or interference, as understood by those skilled in the art. Most automobiles contain a number of electric motors to control the various engine functions, such as pumping hydraulic fluid for braking and steering systems, and for performing other vehicle functions such as operating windshield wipers, electric windows, electric adjustable mirrors, retractable antennas and a whole host of other functions. In addition, electric motors are used extensively in a number of home appliances such as washing machines, dryers, dishwashers, blenders, hair dryers. Due to the prevalence of electric motors and increased electromagnetic emissions standards there is a need for an assembly having differential and common mode filtering.

EMI can be radiated and conducted through electrical lines from such sources as the motor, the control units, and the like. Other sources of interference are generated from equipment coupled to the electrical lines, such as control circuits, computers, switching power supplies, and a variety of other systems, which may generate significant interference which is desired to be eliminated to meet international emission and/or susceptibility standard requirements. Examples of such standards include automotive component EMC specification GMW-3097/3100.

Several other sources of EMI include cross talk and ground bounce. Cross talk in most connectors or carriers is usually the result of mutual inductance between two adjacent lines rather than from parasitic capacitance and occurs when signal currents follow the path of least inductance, especially at high frequencies, and return or couple onto nearby conductors such as conductive tracks positioned parallel with or underneath the signal current track. Ground bounce is caused by shifts in the internal ground reference voltage due to output switching of a component. Ground bounce causes false signals in logic inputs when a device output switches from one state to another.

Differential and common mode currents are typically generated in cables and on circuit board tracks. Controlling these conducted/radiated emissions is necessary to prevent interference with other circuitry or other parts of the circuit generating or sensitive to the unwanted noise. Based upon the known phenomenon of EMI, a variety of filter and surge suppression circuit configurations have been designed as is evident from the prior art. Most electric motor assemblies include multiple inductors and multiple capacitors within a housing of the motor, as well as exterior to the motor, to suppress EMI. However, as packaging space becomes limited, it is more difficult to package these components within the motor housing.

Therefore, X2Y Attenuators has arrived at a compact circuit, a capacitor, that be can be located outside the motor housing and is capable of filtering and suppressing noise generated by the electric motors. Numerous patents disclose the specific structure of the circuit and various uses of the circuit. U.S. Pat. No. 6,509,807 discloses the circuit mounted to a carrier. The carrier and the circuit, when coupled between an energy source and an active load, simultaneously receive and condition the energy propagating to the load in a differentially balanced manner. The conditioning functions provided by the circuit are facilitated, in part, by the electrical connection between the circuit with an external conductive path provided by the carrier. The carrier is connected to an electrical ground, such as an isolated ground, a chassis ground, or earth ground. The carrier is typically a printed circuit board having conductive regions, or tracks, and non-conductive regions, or tracks. The circuit extends across conductive regions and non-conductive regions to connect to a grounding region. U.S. Pat. No. 5,909,350 discloses the circuit used in combination with a motor.

The carrier reduces mechanical and physical stresses such as shock, vibration and various thermal conditions which the circuit would otherwise be subjected to and provides a complete ground shield for the circuit. Because the carrier has a greater surface area then the circuit and a substantial portion of that surface area is covered by metalized ground surface, the carrier acts as a ground shield which absorbs and dissipates electromagnetic interference and over voltages.

However, it has been discovered that when incorporating the carrier and the circuit into the motor assembly, the location of the circuit on the carrier is critical and it impacts the performance of the circuit. Further, it has been determined that soldering motor terminals to the carrier may weaken the connection between the circuit and the carrier which impacts its ability to suppress EMI. If the circuit is located between the terminals, physical stressing, bending, or applying torque to the carrier and the terminal while inserting the terminal through the carrier may cause a failure in the final product, either immediately or later thereby affecting the products overall reliability. Another drawback to using the above described circuit and carrier is that it becomes very tedious to manually handle and mount the circuit on the carrier while it is being assembled. This translates into lower product yields and added expense due to broken or misconnected components. Further, the mounting of the carrier and the circuit outside the motor housing as described in the related art is difficult, while still ensuring a secure connection between the grounding region and the electrical ground.

The prior art assemblies are characterized by one or more inadequacies. Therefore, it would be advantageous to provide a motor assembly having a reliable connection between the terminal and the carrier without lessening the connection between the carrier and the circuit. It would be further advantageous to provide an assembly having a reliable connection between the grounding region of the carrier and the electrical ground to ensure maximum EMI suppression.

BRIEF SUMMARY OF THE INVENTION

The subject invention provides a motor assembly having improved electromagnetic noise or interference (EMI) filtering and dissipation for a vehicle. The assembly includes a motor having at least two terminals extending therefrom for connecting to a power source and a carrier having an upper surface and a lower surface with an outer periphery defining apertures for receiving the terminals of the motor. First and second conductive regions are disposed on one of the upper and the lower surfaces and adjacent the apertures for electrically connecting to the terminals. A grounding region is disposed on one of the upper and the lower surfaces for grounding the carrier to an electrical ground. The first and the second conductive regions are insulated by a first non-conductive region. A circuit extends across the first non-conductive region electrically connecting the first and the second conductive regions to the grounding region for filtering EMI.

The subject invention also includes a biasing device urging the grounding region of the carrier into electrical connection with the electrical ground for dissipating EMI generated by the motor to the electrical ground. Another aspect of the subject invention includes receptacles supported by the carrier electrically connected to the first and the second conductive regions for receiving the terminals without requiring the terminals to be soldered to the carrier.

The subject invention overcomes the inadequacies that characterized the related art assemblies. Specifically, the biasing device maintains the grounding region in electrical connection with the electrical ground which ensures maximum cancellation of EMI and the receptacles securely connect the terminals to the carrier without lessening the connection of the circuit to the carrier.

BRIEF DESCRIPTION OF THE SEVERAL VIEWS OF THE DRAWING

Other advantages of the present invention will be readily appreciated, as the same becomes better understood by reference to the following detailed description when considered in connection with the accompanying drawings wherein:

FIG. 6 is a perspective view of another embodiment of the carrier having receptacle mounted to the upper surface of the carrier;

FIG. 7 is a perspective view of a lower surface of the carrier shown in FIG. 6;

FIG. 8 is a perspective view of the carrier of FIG. 6 in engagement with the terminals and the electrical ground and being biased into contact by a biasing device;

DETAILED DESCRIPTION OF THE INVENTION

Referring to the Figures, wherein like numerals indicate like or corresponding parts throughout the several views, a motor assembly is disclosed having improved electromagnetic noise or interference (EMI) filtering and dissipation. The motor be used in any application but is particularly suited for use in a vehicle (not shown). The assembly is shown generally at 20 in FIG. 1. It is to be appreciated that MEI may be radiated or conducted as known by those skilled in the art.

Figure 2:
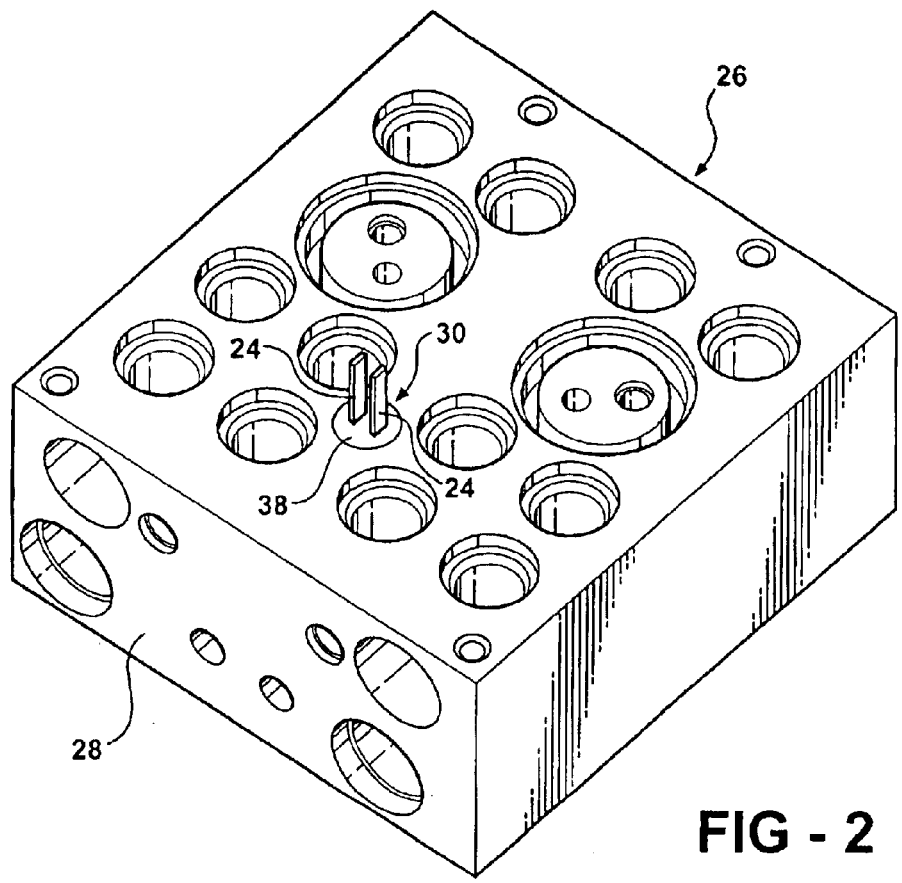
FIG. 2 is a perspective view of an electrical ground having the motor terminals extending therethrough with the carrier in electrical connection with the electrical ground

The assembly 20 includes a motor 22 having at least two terminals 24 extending therefrom for connecting to a power source (not shown). The motor 22 may be any motor in the vehicle, such as, but not limited to, a motor for operating any one of windshield wipers, electric windows or sunroofs, electric adjustable mirrors, retractable antennas, fluid pumps, and the like. The motor 22 may be a two phase motor having a positive terminal and a negative terminal, a three phase motor, or any other phase motor. One embodiment of the motor 22, shown in FIG. 2, is used in combination with a hydraulic control unit 26 (HCU) for pumping hydraulic fluid. The HCU 26 has a housing 28 that acts as an electrical ground 30 connected to the vehicle. The electrical ground 30 may be any other component formed of conductive materials, such as a metal, and is grounded to the vehicle. The housing 28 of the HCU 26 is a conductive material, which is typically formed of aluminum. The housing 28 has an opening 32 through which the terminals 24 of the motor 22 extend through.

Figure 1:
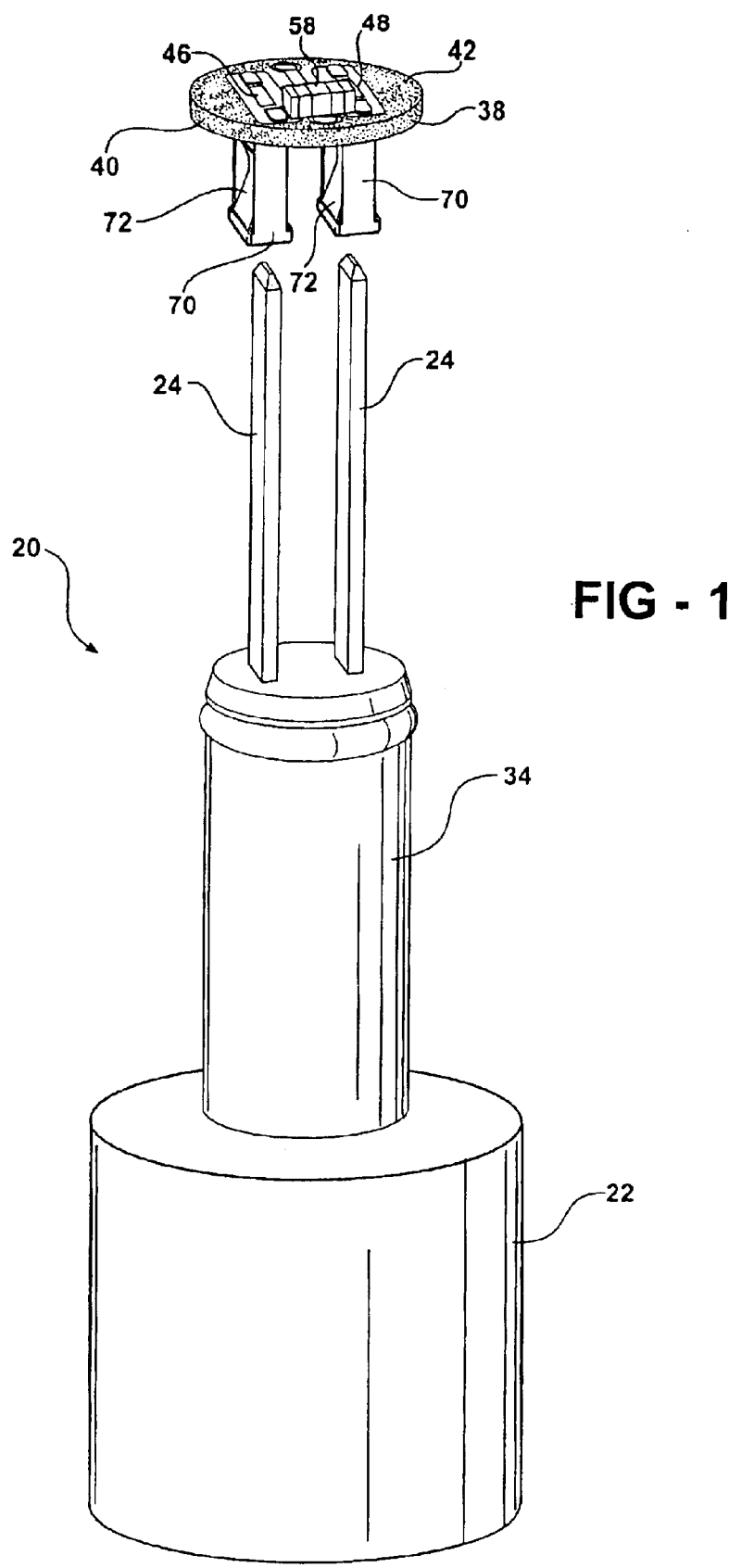
FIG. 1 is a perspective view of a motor having terminals extending therefrom and a carrier mounted thereto.

Referring to FIGS. 1 and 2, the motor 22 may also include a plastic tower 34 extending through the HCU 26 for protecting and insulating the terminals 24. The terminals 24 of the motor 22 extend to an electronic control unit 36 (ECU) (shown in FIG. 15), which controls the vehicles function and upon sending a signal to operate the motor 22, the hydraulic fluid is pumped. It is to be appreciated that those skilled in the art may adapt the subject invention for use with any of the other motors described above.

Referring to FIGS. 3–9, a carrier 38 is shown having an upper surface 40 and a lower surface 42. The carrier 38 has an outer periphery 44 defining apertures 46, 48 that receive the terminals 24 of the motor 22. The carrier 38 is preferably a printed circuit board, as understood by those skilled in the art, formed of a non-conductive material having a conductive material thereon. The carrier 38 is sized depending upon the particular application, such as being circular to fit the HCU 26 and ECU 36. However, when the subject invention is utilized with a motor for windshield wipers, the carrier 38 may be rectangular. The non-conductive material acts as an insulator and one example of the non-conductive material is, but not limited to, plastic. The conductive material is most preferably a metallic surface disposed on each of the upper and lower surfaces 40, 42. The conductive material is capable of being etched away by processes known to those skilled in the art to establish conductive regions and non-conductive regions. However, it is to be appreciated that the conductive material may only be present on a single surface 40, 42 of the carrier 38 depending upon the packaging needs or the application.

The carrier 38 has a first conductive region 50 and a second conductive region 52 disposed on one of the upper and the lower surfaces 40, 42. The first conductive region 50 is adjacent one of the apertures 46, 48 for electrically connecting to one of the terminals 24 and the second conductive region 52 is adjacent the other of the apertures 46, 48 for electrically connecting to the other of the terminals 24. The first and the second conductive regions 50, 52 may completely surround the apertures 46, 48 or only abut a portion of the apertures 46, 48. The first and the second conductive regions 50, 52 facilitate efficient and secure connections with the terminals 24, as will be described more fully below.

The carrier 38 also includes a grounding region 54 on one of the upper and the lower surfaces 40, 42. The grounding region 54 may extend to both of the upper and the lower surfaces 40, 42 depending upon the application of the carrier 38. Preferably, the grounding region 54 extends at least partially around the outer periphery 44 of the carrier 38, and most preferably, the grounding region 54 extends around the outer periphery 44 and splits between the terminals 24. A first non-conductive region 56 insulates the first and the second conductive regions 50, 52 from the grounding region 54. Each of the first and the second conductive regions 50, 52 and the grounding region 54 is formed from the conductive material of the carrier 38. The first non-conductive region 56 is where the conductive material has been removed from the carrier 38, as would be understood by those skilled in the art, or vice versa depending upon the type of printed circuit board utilized in the subject invention.

A circuit 58 extends across the first non-conductive region 56 electrically connecting the first and the second conductive regions 50, 52 to the grounding region 54. The circuit 58 filters the EMI that is being transmitted from the motor 22 through the terminals 24. The circuit 58 may be a capacitor, a varistor, a resistor, or combination thereof. One most preferred circuit 58 is described in the United States patents described above and assigned to X2Y Attenuators, L.L.C. The circuit 58 has conductive and non-conductive bands 60, 62 that align with the respective regions of the carrier 38 for completing the electrical connection. The carrier 38 is positioned adjacent to the electrical ground 30 and is electrically connected thereto. The opening 32 of the housing 28 is recessed for receiving the carrier 38 and for establishing the electrical connection.

In connecting the first and the second conductive regions 50, 52 with the grounding region 54, the circuit 58 must be positioned carefully and precisely on the carrier 38 to ensure maximum and continued performance. Therefore, a mounting region 64 is defined between the outer periphery 44 and the apertures 46, 48 of the carrier 38 for locating the circuit 58 in the mounting region 64 spaced from the apertures 46, 48. The circuit 58 may be surface mounted to the carrier 38 or may extend through the carrier 38, as understood by those skilled in the art. It has been found that when the two terminals 24 are positioned parallel to one another and the circuit 58 is positioned between the terminals 24, the force exerted on the carrier 38 and the circuit 58 when the terminals 24 are passed through the apertures 46, 48 causes the circuit 58 to fail. This may be attributed to the circuit 58 being fragile and the force cracking the circuit 58 or the circuit 58 may become dislodged from the carrier 38. Accordingly, the circuit 58 is set-off from the apertures 46, 48 and positioned between the outer periphery 44 and the apertures 46, 48 such that the respective conductive and non-conductive regions and bands align. In order to have adequate space for the circuit 58 to be mounted, the apertures 46, 48 may be offset from a center line 66 of the circuit 58. Offsetting the apertures 46, 48 provides additional space for securing the circuit 58 to the carrier 38.

Figure 3:
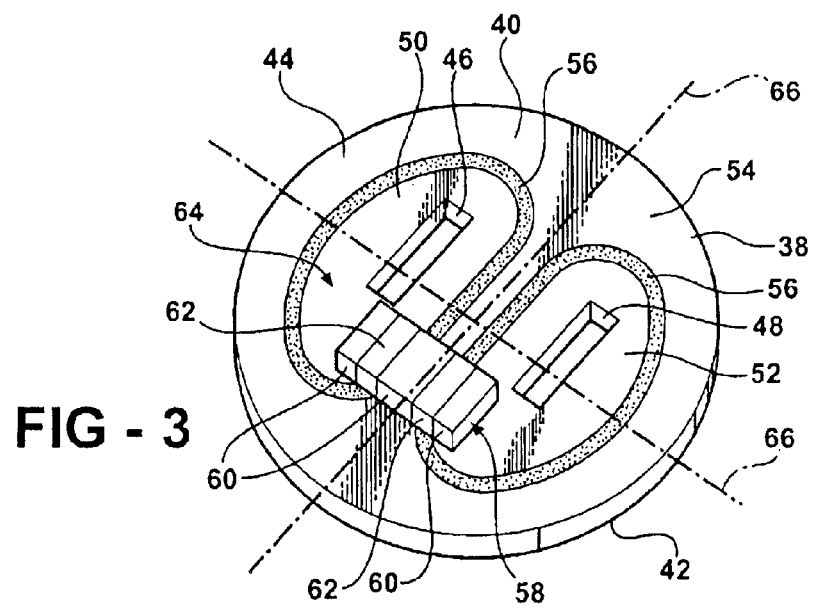
FIG. 3 is a perspective view of one embodiment of a carrier according to the subject invention.
Figure 4:
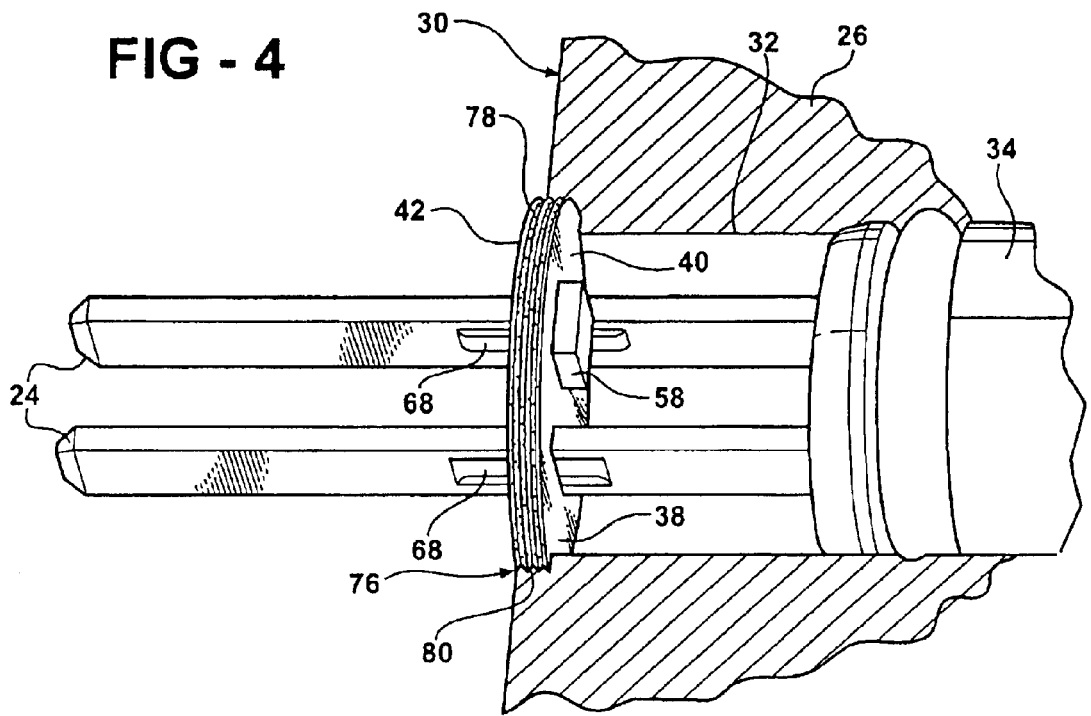
FIG. 4 is a cross-sectional view of the carrier of FIG. 3 in engagement with the terminals and the electrical ground.
Figure 5:
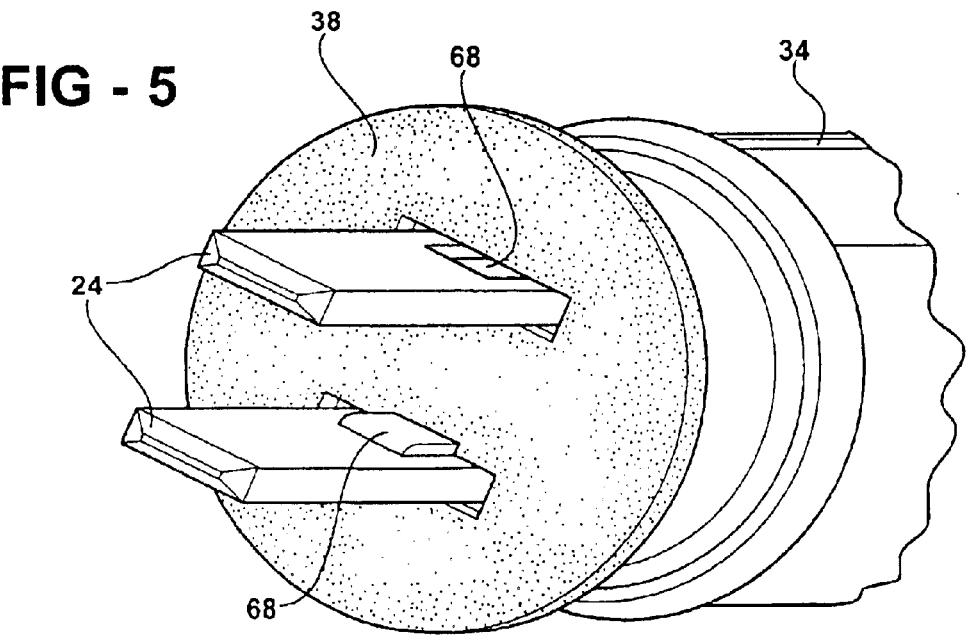
FIG. 5 is a perspective view of an upper surface of the carrier of FIG. 3 engaging the terminals of the motor.

One embodiment of the carrier 38 is shown in FIG. 3 having the first and the second conductive regions 50, 52, the non-conductive region, and the grounding region 54 all on the same surface of the carrier 38. The circuit 58 is mounted in the mounting region 64 spaced from the apertures 46, 48. In FIG. 4, the apertures 46, 48 of the carrier 38 receive the terminals 24 of the motor 22 and the grounding region 54 is in contact with the electrical ground 30.

Another embodiment of the carrier 38 is shown in FIGS. 6 and 7 having the first and the second conductive regions 50, 52 and the non-conductive region on both the upper and the lower surfaces 40, 42, and the circuit 58 and the grounding region 54 on the upper surface 40. Any EMI from the terminals 24 is dissipated into the first and second conductive regions 50, 52 on the lower surface 42 and is passed to the upper surface 40. The EMI is then transmitted through the circuit 58 on the upper surface 40 into the grounding region 54. FIG. 8 illustrates the carrier 38 mounted to the electrical ground 30 for dissipating the EMI. However, the electrical ground 30 has a raised lip 88 to engage the grounding region 54 more towards the center of the carrier 38. This helps to ensure a solid electrical connection therebetween.

Figure 9:
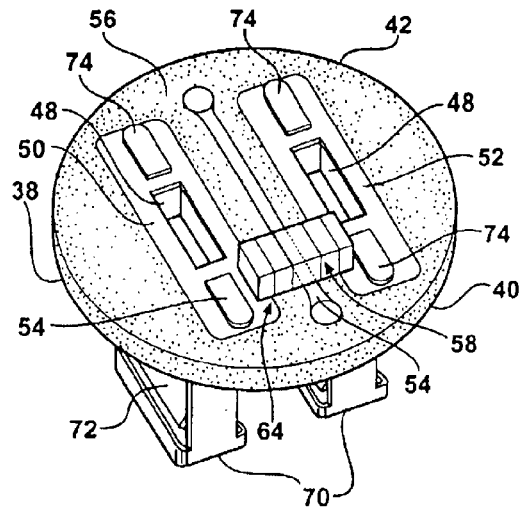
FIG. 9 is a perspective view of the lower surface of still another embodiment of the carrier.
Figure 10:
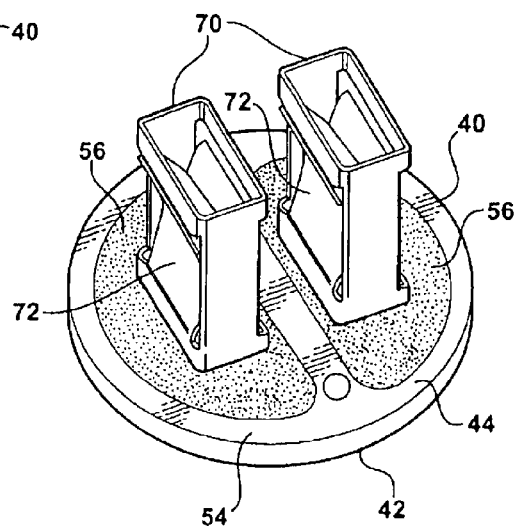
FIG. 10 is a perspective view of the upper surface of the carrier illustrated in FIG. 9.
Figure 11:
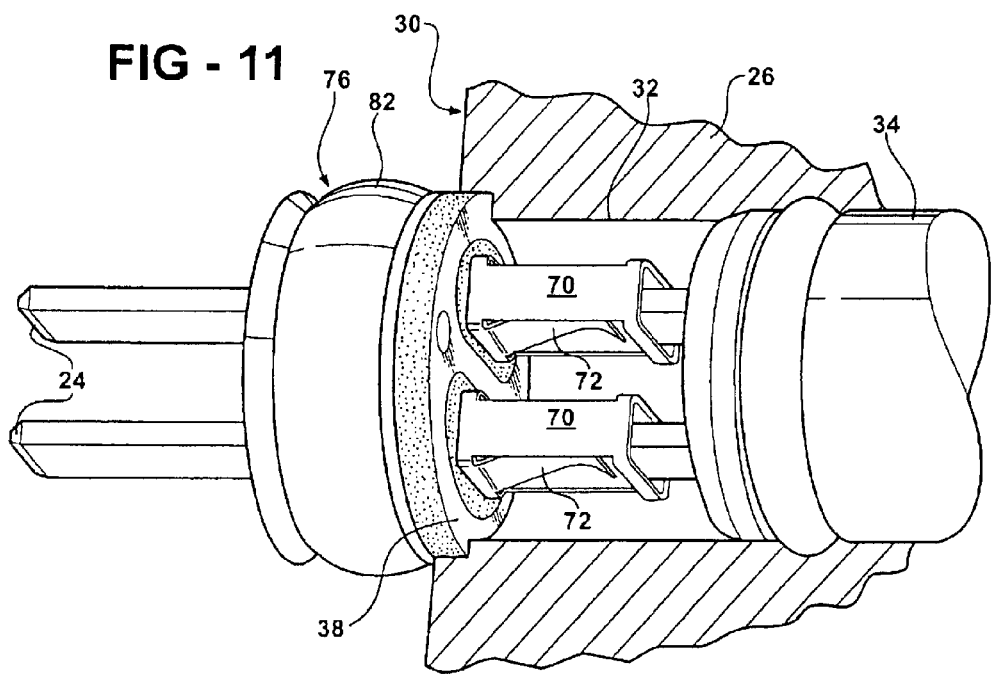
FIG. 11 is a perspective view of the lower surface of the carrier of FIG. 9 biased by the biasing device into engagement with the electrical ground.
Figure 12:
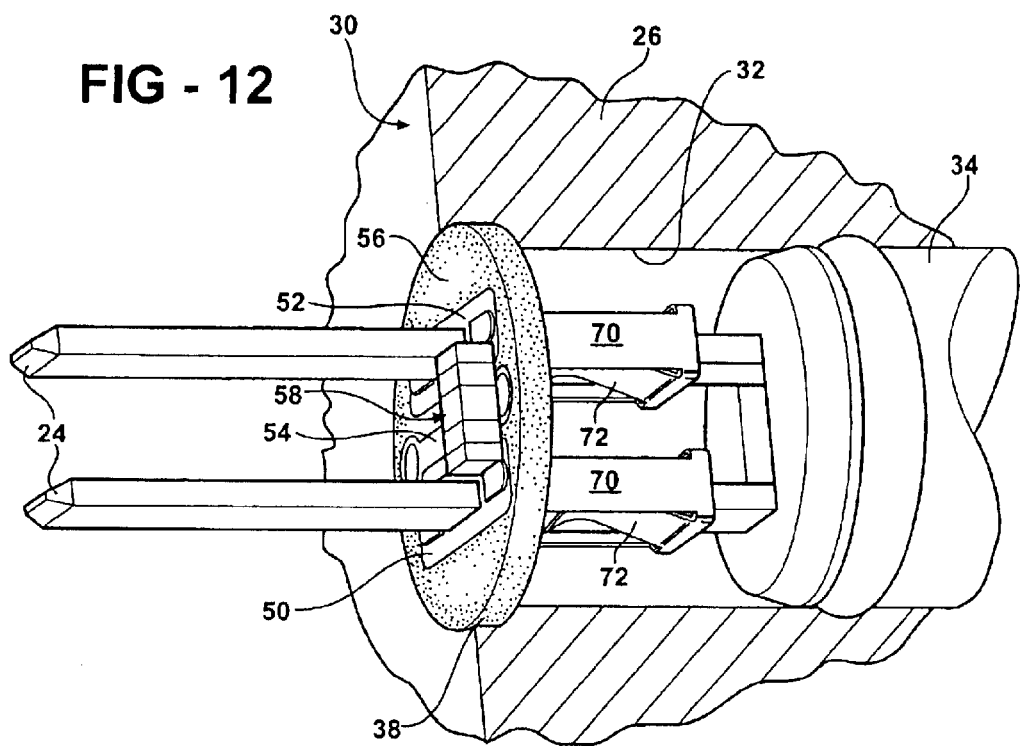
FIG. 12 is a perspective view the upper surface of the carrier of FIG. 9 in engagement with the electrical ground.
Figure 13:
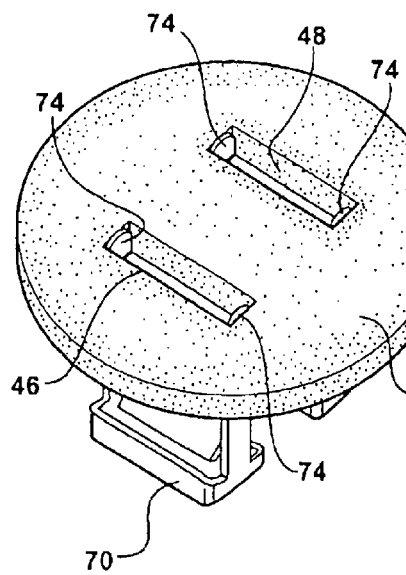
FIG. 13 is a perspective view of a lower surface of yet still another embodiment of the carrier having the receptacles mounted through apertures of the carrier.
Figure 14:
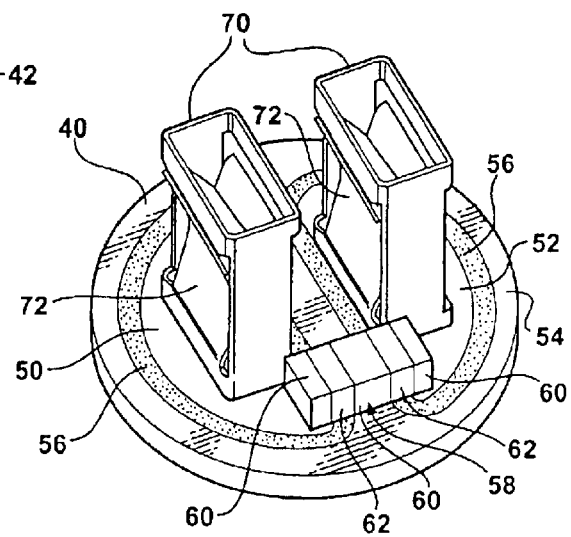
FIG. 14 is a perspective view of an upper surface of the carrier shown in FIG. 13.

Still another embodiment of the carrier 38 is illustrated in FIGS. 9 and 10. The carrier 38 has the first and the second conductive regions 50, 52, the non-conducting region, and the circuit 58 on the lower surface 42. The grounding region 54 is located on the both upper and the lower surfaces 40, 42. The EMI is transmitted from the terminals 24 to the first and the second conductive regions 50, 52 on the lower surface 42. The EMI flows through the circuit 58 and into the grounding region 54 on the lower surface 42, which passes it to the grounding region 54 on the upper surface 40. FIGS. 11 and 12 illustrate the grounding region 54 on the upper surface 40 in contact with the electrical ground 30 for grounding the EMI.

In each of the embodiments illustrated in FIGS. 3–14, the terminals 24 are connected to the carrier 38 and the first and the second conductive regions 50, 52 without soldering. It is advantageous to connect the terminals 24 without soldering because soldering may loosen the circuit 58 from the carrier 38 and provide faulty connections. If the terminals 24 are not soldered, then the connection between the terminals 24 and the first and the second conductive regions 50, 52 must remain stable enough to dissipate the EMI. Specifically, referring back to FIGS. 3 though 5, the terminals 24 include tabs 68 extending outwardly for electrically connecting to the first and the second conductive regions 50, 52. Once the terminals 24 are inserted through the carrier 38, the tabs 68 lock into the apertures 46, 48 creating a secure connection. In such an embodiment, the apertures 46, 48 must be electrically conductive, or through plated, as understood by those skilled in the art.

In FIGS. 6 through 14, receptacles 70 are mounted to the carrier 38 for electrically connecting the terminals 24 to the first and the second conductive regions 50, 52. The receptacles 70 are formed of a conductive material, such as, but not limited to, copper, tin plated brass, or spring steel. The spring steel is preferred because it provides the tension for an interference fit. The receptacles 70 are sized to receive the terminals 24 and create an interference fit therebetween. The receptacles 70 allow for a secure connection between the terminals 24 and the first and the second conductive regions 50, 52 without having to solder the terminals 24 to the carrier 38. Various methods would be recognized by those skilled in the art to create the interference fit, such as including tangs 72 within the receptacles 70 for electrically connecting the terminals 24 to the receptacles 70. The tangs 72 bias inwardly from the periphery of the receptacles 70 and against the terminals 24. When the terminals 24 are inserted into the receptacles 70, the tangs 72 are pushed outwardly and the counter acting inward force of the tangs 72 frictionally secures the terminals 24 in the receptacles 70. It is preferred that the tangs 72 have a surface area coextensive with the terminals 24 to allow for maximum filtering and dissipation of EMI.

In order to mount the receptacles 70 to the carrier 38, projections 74 may extend either though the carrier 38 or in abutting engagement with the apertures 46, 48. The receptacles 70 may also be directly surface mounted to the carrier 38, with or without the projections 74, and in contact with the conductive regions 50, 52. The projections 74 establish the electrical connection between the receptacle and the first and the second conductive regions 50, 52. Since the receptacles 70 can be secured to the carrier 38 prior to circuit 58, the projections 74 may be soldered to the carrier 38. Alternatively, the receptacles 70 may be bent over to secure the receptacles 70 to the carrier 38 without soldering. In FIGS. 7 and 9, the projections 74 are illustrated as extending through the carrier 38 and being bent into engagement with the first and the second conductive regions 50, 52. Whereas in FIG. 13, the projections 74 extend through and into abutting engagement with the apertures 46, 48.

Figure 15:
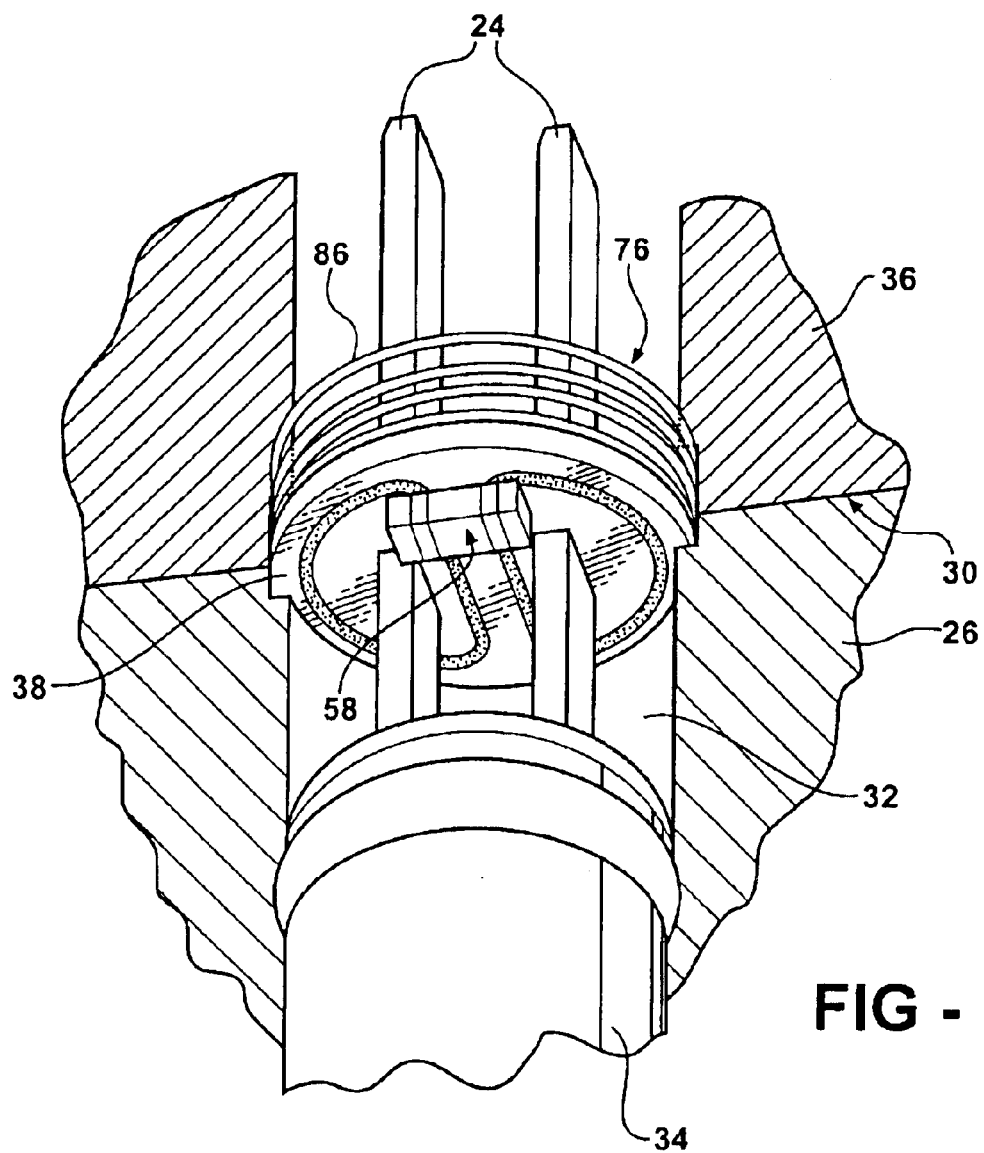
FIG. 15 is a perspective view of an alternate embodiment of the biasing device urging a grounding region into contact with the electrical ground.

Referring to FIGS. 4, 8, and 15, a biasing device 76 urges the grounding region 54 of the carrier 38 into electrical connection with the electrical ground 30. Any EMI generated by the motor 22 is filtered through the circuit 58 and dissipated to the electrical ground 30, as discussed above. However, in order to dissipate a maximum amount of EMI, the grounding region 54 must be securely connected to the electrical ground 30. In the embodiment shown in FIG. 4, the biasing device 76 is illustrated as the outer periphery 44 of the carrier 38 having threads 78 and the electrical ground 30 being threaded 80 for receiving the carrier 38. The threaded 80 outer periphery 44 maintains the carrier 38 in contact with the grounding region 54. The threads 80 may act as a snap-fit and create an electrical connection therebetween.

In FIG. 8, the biasing device 76 is illustrated as a grommet 82 engaging the terminals 24 and maintaining the grounding region 54 in contact with the electrical ground 30. The grommet 82 has slots slightly larger than the terminals 24 that frictionally engage the terminals 24. Once the grommet 82 is abutted against the carrier 38, the carrier 38 will not be able to become unseated from the grounding region 54 ensuring a solid connection. The grommet 82 is preferably formed of a non-conductive material, such as rubber. The grommet 82 also provides environmental protection to ensure that any fluid does not escape from within the housing 28, and acts like a secondary seal.

In FIG. 15, the biasing device 76 is illustrated as a spring 86 engaging the carrier 38 and biasing the grounding region 54 in contact with the electrical ground 30. It is to be appreciated that the biasing device 76 may be other than as described as above, such as, but not limited to fasteners (not shown) extending through the carrier 38 and into the housing 28 to continuously urge the grounding region 54 in contact with the electrical ground 30.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A motor assembly having improved electromagnetic noise filtering and dissipation for a vehicle, said assembly comprising:
   a motor having at least two terminals extending therefrom for connecting to a power source;
   a carrier having an upper surface and a lower surface with an outer periphery defining apertures for receiving said terminals of said motor;
   a first conductive region disposed on one of said upper and said lower surfaces and adjacent one of said apertures for electrically connecting to one of said terminals;
   a second conductive region disposed on one of said upper and said lower surfaces and adjacent said other of said apertures for electrically connecting to said other of said terminals;
   a grounding region extending about said carrier on one of said upper and said lower surfaces for grounding said carrier;
   a first non-conductive region insulating said first and said second conductive regions from said grounding region;
   a circuit extending across said first non-conductive region electrically connecting said first and said second conductive regions to said grounding region for filtering electromagnetic noise;
   an electrical ground positioned adjacent to and electrically connected to said carrier; and
   a biasing device urging said grounding region of said carrier into electrical connection with said electrical ground for dissipating electromagnetic noise generated by said motor to said electrical ground.

2. An assembly as set forth in claim 1 wherein said biasing device is further defined as a grommet engaging said terminals maintaining said grounding region in contact with said electrical ground.

3. An assembly as set forth in claim 2 wherein said grommet is further defined as frictionally engaging said terminals.

4. An assembly as set forth in claim 1 wherein said biasing device is further defined as said outer periphery having threads and said electrical ground being threaded for receiving said outer periphery for maintaining said grounding region in contact therewith.

5. An assembly as set forth in claim 1 wherein said biasing device is further defined as a spring engaging said carrier to maintain said grounding region in contact with said electrical ground.

6. An assembly as set forth in claim 1 further including a mounting region defined between said outer periphery and said apertures for locating said circuit in said mounting region spaced from said aperture.

7. An assembly as set forth in claim 1 wherein said terminals are further defined as including tabs extending from said terminals for electrically connecting to said first and said second conductive regions.

8. An assembly as set forth in claim 1 wherein said carrier is further defined as having said grounding region on said upper surface and having said first and said second conductive regions, said first non-conductive region, and said circuit on said lower surface.

9. An assembly as set forth in claim 1 wherein said carrier is further defined as having said first and said second conductive regions and said first non-conductive region on both of said upper and said lower surfaces and having said grounding region on said upper surface and said circuit on said lower surface.

10. An assembly as set forth in claim 1 further including receptacles engaging said apertures electrically connected to said first and said second conductive regions and receiving said terminals to electrically connect said terminals to said first and said second conductive regions.

11. An assembly as set forth in claim 1 wherein said grounding region is further defined as extending at least partially around said outer periphery.

12. An assembly as set forth in claim 1 wherein said electrical ground is further defined as a housing of a control unit of the vehicle.

13. An assembly as set forth in claim 12 wherein said housing is further defined as being formed of a conductive material.

14. A motor assembly having improved electromagnetic noise filtering and dissipation for a vehicle, said assembly comprising:

a motor having at least two terminals extending therefrom for connecting to a power source;

a carrier having an upper surface and a lower surface with an outer periphery defining apertures for receiving said terminals of said motor;

a first conductive region disposed on one of said upper and said lower surfaces and adjacent one of said apertures for electrically connecting to one of said terminals;

a second conductive region disposed on one of said upper and said lower surfaces and adjacent said other of said apertures for electrically connecting to said other of said terminals;

a grounding region on one of said upper and said lower surfaces for grounding said carrier;

a first non-conductive region insulating said first and said second conductive regions from said grounding region;

a circuit extending across said first non-conductive region electrically connecting said first and said second conductive regions to said grounding region for filtering electromagnetic noise;

an electrical ground positioned adjacent to and electrically connected to said carrier; and receptacles supported by said carrier electrically connected to said first and said second conductive regions for receiving said terminals.

15. An assembly as set forth in claim 14 wherein said receptacles include tangs within said receptacles for electrically connecting said terminals to said receptacles.

16. An assembly as set forth in claim 15 wherein said tangs are further defined as being biased outwardly against said terminals to frictionally secure said terminals in said receptacles.

17. An assembly as set forth in claim 15 wherein said tangs are further defined as having a surface area being coextensive with said terminals to allow for maximum filtering and dissipation of electromagnetic noise.

18. An assembly as set forth in claim 14 further including projections extending from said receptacles engaging said first and said second conductive regions for establishing said electrical connection.

19. An assembly as set forth in claim 18 wherein said projections extend through said carrier.

20. An assembly as set forth in claim 18 wherein said projections extend in abutting engagement with said apertures.

21. An assembly as set forth in claim 14 wherein said electrical ground is further defined as a housing of a control unit of the vehicle.

22. An assembly as set forth in claim 21 wherein said housing is further defined as being formed of a conductive material.

23. An assembly as set forth in claim 14 further including a mounting region defined between said outer periphery and said apertures for locating said circuit in said mounting region.

24. An assembly as set forth in claim 14 wherein said carrier is further defined as having said grounding region on said upper surface and having said first and said second conductive regions, said first non-conductive region, and said circuit on said lower surface.

25. An assembly as set forth in claim 14 wherein said carrier is further defined as having said first and said second conductive regions and said first non-conductive region on both of said upper and said lower surfaces and having said grounding region on said upper surface and said circuit on said lower surface.

* * * * *